United States Patent
Kruecken et al.

(10) Patent No.: US 12,326,465 B2
(45) Date of Patent: Jun. 10, 2025

(54) DETECTOR CIRCUIT

(71) Applicant: NXP B.V., Eindhoven (NL)

(72) Inventors: Joachim Josef Maria Kruecken, Munich (DE); Chao Wan, Tianjin (CN)

(73) Assignee: NXP B.V., Eindhove (NL)

( * ) Notice: Subject to any disclaimer, the term of this patent is extended or adjusted under 35 U.S.C. 154(b) by 48 days.

(21) Appl. No.: 18/477,930

(22) Filed: Sep. 29, 2023

(65) Prior Publication Data

US 2024/0133927 A1 Apr. 25, 2024
US 2024/0230727 A9 Jul. 11, 2024

(30) Foreign Application Priority Data

Oct. 20, 2022 (CN) .......................... 202211290715.6

(51) Int. Cl.
*H03K 5/1252* (2006.01)
*G01R 19/165* (2006.01)
*H03K 3/037* (2006.01)
*H03K 19/0185* (2006.01)

(52) U.S. Cl.
CPC ..... *G01R 19/16519* (2013.01); *H03K 3/0375* (2013.01); *H03K 19/018521* (2013.01)

(58) Field of Classification Search
CPC ........ H03K 5/125; H03K 5/1252; H03K 5/22; H03K 5/24; H03K 3/0375; H03K 19/0175; H03K 19/018521; G01R 19/165; G01R 19/16504; G01R 19/16519
See application file for complete search history.

(56) References Cited

U.S. PATENT DOCUMENTS

| | | | |
|---|---|---|---|
| 9,369,124 B2 | 6/2016 | Gunther et al. | |
| 11,750,184 B1 * | 9/2023 | Quan | H03K 5/1252 327/34 |
| 2003/0226082 A1 | 12/2003 | Kim et al. | |
| 2018/0164351 A1 | 6/2018 | Nirwan et al. | |

OTHER PUBLICATIONS

Kamil Gomina et al., "Power supply glitch attacks: design and evaluation of detection circuits", Hardware-Oriented Security and Trust (HOST), 2014 IEEE International Symposium on. IEEE, May 2014.

* cited by examiner

*Primary Examiner* — Long Nguyen (57) ABSTRACT

A circuit arrangement for detecting a glitch on a supply voltage comprising a low pass filter arrangement coupled to a supply terminal and configured provide a filtered supply voltage. The circuit arrangement comprises a first and second detector circuit each configured to receive the supply voltage and the filtered supply voltage and configured to provide a first and second detection signal indicative of a glitch comprising a transient, positive and a transient negative change in the supply voltage at a first detector output terminal and second detector output terminal respectively. The circuit arrangement further comprises a circuit-arrangement output terminal configured to provide an output signal indicative of the detection of a glitch in the supply voltage based on the first detection signal and the second detection signal.

13 Claims, 3 Drawing Sheets

DETECTOR CIRCUIT

CROSS-REFERENCE TO RELATED APPLICATION

This application claims priority under 35 U.S.C. § 119 to Chinese Patent application no. 202211290715.6, filed 20 Oct. 2022, the contents of which are incorporated by reference herein.

FIELD

The present disclosure relates to a circuit arrangement. In particular, it relates to a circuit arrangement for detecting a glitch comprising a change, such as a transient change, in a supply voltage.

BACKGROUND

In some instances, changes to a supply voltage for a circuit can cause the circuit to malfunction. For example, in some circuits a supply voltage for logic circuitry can be maliciously changed causing the logic circuitry to malfunction. In particular, the operation of logic circuits of the circuit can be disrupted by one or more transient changes in the supply voltage known in the art as glitches. A supply voltage for a circuit may be manipulated by an attacker purposely to cause a malfunction in the operation of the circuit. It is also known that some sudden glitches to the supply voltage can cause timing issues or change the state of a bistable device.

SUMMARY

According to a first aspect of the present disclosure there is provided a circuit arrangement for detecting a glitch on a supply voltage. The circuit arrangement includes a supply terminal configured to receive the supply voltage, a low pass filter arrangement coupled to the supply terminal and configured to receive the supply voltage and provide a filtered supply voltage, first and second detector circuits, first and second detector terminals, and a circuit-arrangement output terminal. The first detector circuit includes a PMOS transistor and a first resistor with a first terminal and a second terminal. The PMOS transistor includes a source terminal configured to receive the supply voltage, a gate terminal configured to receive the filtered supply voltage, and a drain terminal coupled to the first terminal of the first resistor wherein the second terminal of the first resistor is coupled to a reference voltage terminal, the reference voltage terminal configured to be coupled to a reference voltage. The first detector output terminal is coupled to the first terminal of the first resistor, and the first detector output terminal is configured to provide a first detection signal indicative of a glitch comprising a transient, positive change in the supply voltage. The second detector circuit includes a PMOS transistor and a NMOS transistor. The PMOS transistor includes a source terminal configured to receive the filtered supply voltage, a gate terminal configured to receive the supply voltage, and a drain terminal. The NMOS transistor includes a drain terminal, a gate terminal configured to receive the supply voltage, a source terminal configured to be coupled to the reference voltage terminal, and where the drain terminal of the NMOS transistor is coupled to the drain terminal of the PMOS transistor. The second detector output terminal is coupled to the drain of the PMOS transistor and to the drain of the NMOS transistor, where the second detector output terminal is configured to provide a second detection signal indicative of a glitch comprising a transient, negative change in the supply voltage. The circuit-arrangement output terminal is configured to provide an output signal indicative of the detection of a glitch in the supply voltage based on the first detection signal and the second detection signal.

In one or more embodiments the circuit arrangement may further include logic OR circuitry configured to receive the first detection signal and the second detection signal and wherein the output signal is based on either or both of the first detection signal and the second detection signal being indicative of a glitch.

In one or more embodiments the circuit arrangement may further include a second supply terminal configured to receive a second supply voltage, and the circuit arrangement includes a first voltage domain based on the supply voltage provided at the supply terminal, and a second voltage domain based on the second supply voltage provided at the second supply terminal, where the first detector circuit and second detector circuit form part of the first voltage domain, and the circuit-arrangement output terminal comprises part of the second voltage domain, and the circuit arrangement comprises a level shifter configured to receive one or more signals based on the first detection signal and the second detection signal and level shift said one or more signals to the second voltage domain for providing said output signal at the circuit-arrangement output terminal.

In one or more examples the circuit arrangement may further include a level shifter arrangement for shifting the output signal from the first supply voltage level to a second, different voltage level. The level shifter arrangement includes a second supply terminal, an inverter arrangement, and a level shifter, where the second supply terminal is coupled to the second, different supply voltage, and the output signal is based on the output of the level shifter and is a signal in the second voltage level.

In one or more embodiments the first supply voltage level may be lower than the second voltage level.

In one or more embodiments the first supply voltage level may be the same as the second voltage level.

In one or more examples the first supply voltage level may be for providing power to components in a first voltage domain of the circuit and the second supply voltage level is for providing power to components in a second different voltage domain of the circuit or to a terminal configured to be coupled to an external circuit.

In one or more examples the first voltage domain may be 0.8V and the second voltage domain may be 1.8V.

In one or more embodiments the circuit arrangement may further include a latching circuit the latching circuit configured to receive at least one signal based on one or both of the first detection signal and the second detection signal and configured to latch the output signal for a further circuit.

In one or more embodiments the latching circuit may be a RS Flip Flop.

In one or more embodiments the RS Flip Flop may be configured to receive a reset signal from the further circuit.

In one or more embodiments the low pass filter arrangement may include a first low pass filter, and a second low pass filter, where the first low pass filter is configured receive the supply voltage and provide a filtered supply voltage to the first detector circuit, and the second low pass filter is configured to receive the supply voltage and provide a filtered supply voltage to the second detector circuit.

In one or more embodiments the low pass filter arrangement may include at least one RC filter.

In one or more embodiments the first resistor may have a resistance value based on the off resistance of the PMOS transistor used in the first detector.

In one or more embodiments the circuit arrangement may further include a logic OR circuitry with a first logic input terminal, a second logic input terminal, and a logic output terminal, where the first logic input terminal is connected to the first detector output terminal, and the second logic input terminal is connected to the second detector output terminal, and where the logic output terminal is coupled to the circuit-arrangement output terminal.

In one or more embodiments the circuit arrangement may further include a level shifter arrangement with a first level shifter input terminal, a second level shifter input terminal, and a level shifter output terminal, where the first level shifter input terminal and the second level shifter input terminal are connected to the logic output terminal and the level shifter output terminal is coupled to the circuit-arrangement output terminal.

In one or more embodiments the circuit arrangement may further include a latching circuit comprising a RS flip flop circuit, including an input terminal, a reset terminal, and a latching output terminal, where the input terminal is coupled to the level shifter output terminal, the reset terminal is connectable to a further circuit to reset the RS flip flop circuit, and where the latching output terminal is connected to the circuit-arrangement output terminal.

In one or more examples the first detector circuit may be configured to only conduct current when the voltage difference between the supply voltage and filtered supply voltage above a threshold voltage of the PMOS transistor of the first detector circuit.

In one or more examples the second detector circuit may be configured to only conduct current when the voltage difference between the supply voltage and filtered supply voltage above a threshold voltage of the PMOS transistor of the first detector circuit.

In one or more examples the threshold voltage may be defined by Vgs of the transistor.

In one or more examples the level shifter may further include an inverter arrangement with an inverter input terminal and an inverter output terminal, where the inverter input terminal is connected to the logic output terminal, and the inverter output terminal is connected to one of the first level shifter input terminal and the second level shifter input terminal, where the other of the first level shifter input terminal and the second level shifter input terminal is connected to the logic output terminal.

In one or more examples the inverter arrangement may be configured to provide an inverted version of the signal at the logic output terminal in order to provide the level shifter with an inverted signal and a non-inverted signal based on the first detector signal and the second detector signal.

According to a second aspect of the present disclosure there is provided an electronic device including the circuit arrangement of the first aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

A circuit, such as a circuit formed of one or more logic gates, can be caused to malfunction by changes to a supply voltage for the circuit. In some examples, the supply voltage for the circuit may be manipulated by an attacker to cause a malfunction in the operation of the circuit.

The changes to the supply voltage may comprise one or more transient pulses, known as glitches, which may be applied to the supply terminal that provides the supply voltage to the circuit or circuit arrangement. When these glitches are applied maliciously they are typically referred to as "glitch attacks". The terms "glitch" and "glitches" will be used to refer to any change in the supply voltage that could potentially cause a malfunction whether or not the glitch was caused by malicious action. The transient pulses may comprise one or more transient, positive and/or negative changes in the supply voltage. These pulses can cause the circuit to respond in an unintended manner.

Glitches can also affect the operation of safety systems and so it may be advantageous in one or more examples to accurately detect glitches. In one or more examples, a circuit may be provided to detect glitches on a logic supply rail which provides a logic voltage level to one or more logic circuits.

Thus, in one or more examples, the effective detection of glitches, and therefore glitch attacks, is important.

Glitches may also occur when the circuit is in a standby mode. It may therefore be advantageous to provide a detector which uses as little standby current as possible. Ideally a small die size is also advantageous to improve manufacturing efficiencies.

Typically, glitches comprise pulses with a 1 ns rise/fall time and a 3 ns pulse width. However, the rise/fall times can be longer or shorter than 1 ns, in some examples the rise and fall times can be less than 1 ns, less than 2 ns, less than 5 ns or less then 10 ns. In other examples the duration of the pulse can be longer or shorter than 3 ns. In one or more examples, the glitches may have a pulse width of less than 50 ns, less than 25 ns, less than 10 ns or less than 5 ns. In other examples the pulse width may be up to 100 ns, up to 200 ns, up to 500 ns or longer than 500 ns in duration.

As an example, for a 0.8V supply voltage a glitch that increases the supply voltage, i.e. a positive glitch, may increase the supply voltage to around 1.4V. Further, a glitch that decreases the supply voltage, i.e. a negative glitch, may decrease the supply voltage to around 0.2V. In other examples the magnitude of a positive glitch may temporarily increase the supply voltage to a voltage that is above or below 1.4V. In yet other examples the magnitude of a negative glitch may temporarily decrease the supply voltage to a voltage that is above or below 0.2V. It will be appreciated that glitches can be of any other magnitude or sign. In some examples the glitch may be detected if it has a magnitude above a certain threshold.

The example embodiments disclosed herein provide a circuit arrangement that includes a first detector circuit, a second detector circuit together with a low pass filter arrangement that are configured to detect a glitch, that is at least a transient change of a supply voltage. In general terms, the first detector circuit and second detector circuit are configured to receive the supply voltage and a filtered supply voltage from the low pass filter arrangement to different terminals of the first and second detector circuits and differences, such as transient differences between them may be considered to be indicative of the occurrence of a glitch.

Figure 1:
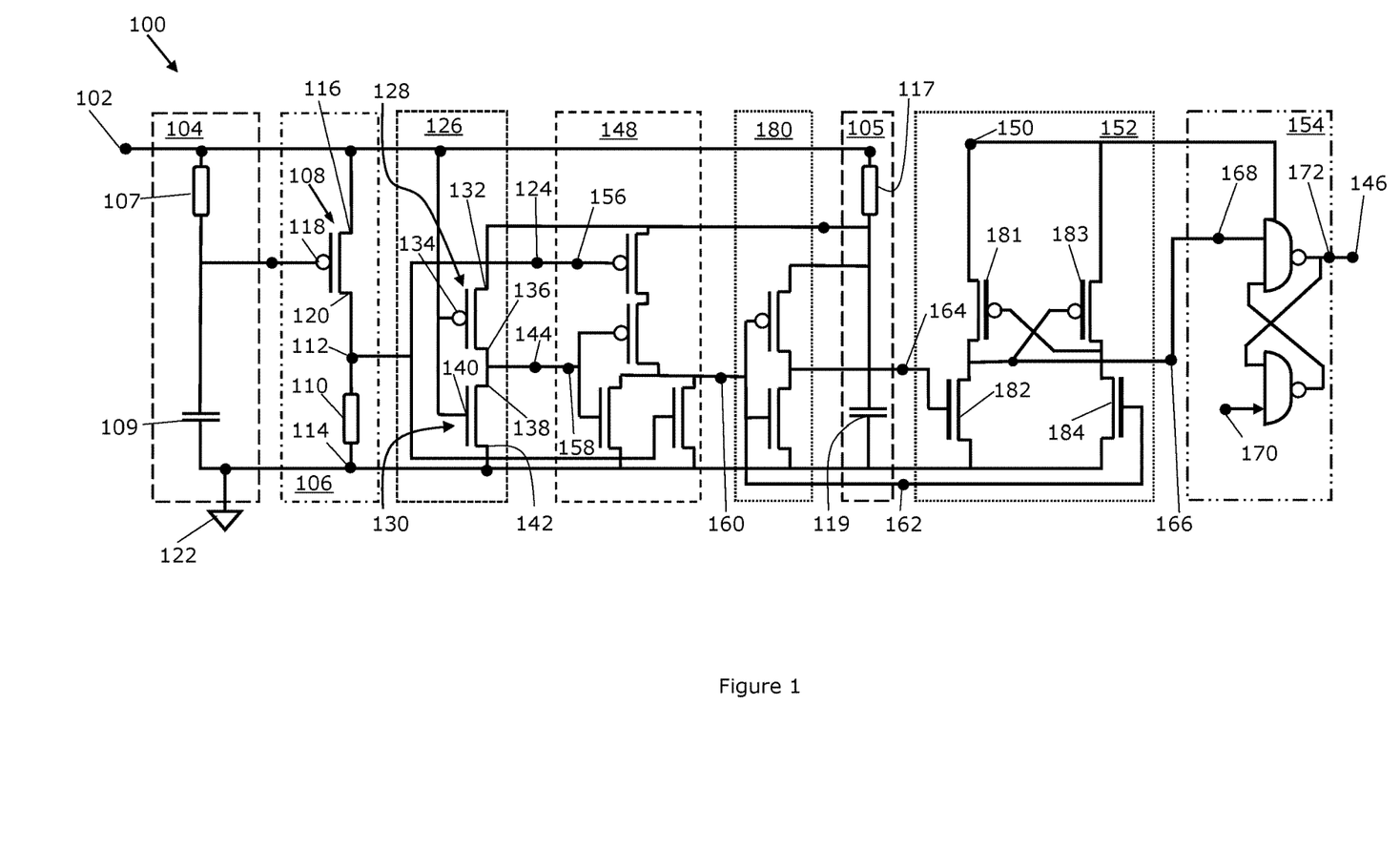
FIG. 1 shows a circuit diagram of an embodiment of the circuit arrangement comprising a first detector circuit, a second detector circuit and a low pass filter arrangement, with optional logic OR/NOR circuitry, a level shifter and a latching circuit.

Example FIG. 1 shows an overview of a circuit arrangement 100 comprising a supply terminal 102 coupled to a low pass filter arrangement 104, 105, a first detector circuit 106 and a second detector circuit 126. The first and second detector circuits, together with the low pass filter arrangement are configured to provide a first detection signal and a second detection signal indicative of the occurrence of a detected difference between a supply voltage at the supply terminal 102 and a voltage provided by the low pass filter arrangement. In one or more example, said detected difference may be considered to indicate a glitch comprising a transient change in the supply voltage. Also shown in FIG. 1 is a logic NOR circuitry 148, a latching circuit 154, a level shifter 152 and an inverter arrangement 180 to be used with the level shifter 152.

In particular, FIG. 1 discloses a circuit arrangement 100 for detecting a glitch on a supply voltage. As described above a glitch may be defined as a transient, positive or negative change in the supply voltage. Glitches may be capable of affecting the state of logic components, which may be formed of transistors within another circuit that is also coupled to the supply voltage terminal 102. In other examples glitches may bring about timing errors between timing-sensitive devices which can lead to circuit to malfunction. In particular examples, the another circuit may be a logic circuit susceptible to a glitch in the supply voltage. Thus, the circuit arrangement 100 may be configured to monitor the supply voltage on behalf of said other circuit. Any glitch on the supply voltage can thus be detected and the necessary remedial action can be taken to either protect the other circuit or flag errors to allow the output of the other circuit to be appropriately assessed. The circuit arrangement 100 comprises the supply terminal 102 configured to receive the supply voltage and the low-pass filter arrangement 104, 105 coupled to the supply terminal 102 and that is configured to receive the supply voltage. The low-pass filter arrangement 104, 105 is configured to provide a filtered supply voltage at an output of the low-pass filter arrangement. In some examples the filtered supply voltage is decoupled or otherwise isolated from the noise on the supply terminal 102.

The low-pass filter arrangement 104, 105 is configured to filter out high frequency components of the supply voltage at the supply terminal 102. Due to the nature of glitches as was described above, the low pass filter 104 can filter out the glitches comprising transient changes in supply voltage (i.e., short lived, high frequency components). The output of the low-pass filter arrangement 104, 105 is configured to comprise the relatively low frequency components of supply voltage, which is provided to an output of the low-pass filter arrangement. It will be appreciated that in some examples the low-pass filter arrangement 104, 105 may comprise one or more RC filters. In one or more examples, the low-pass filter arrangement 104, 105 may comprise a passive or an active low-pass filter. It will also be appreciated that the low-pass filter can be designed to attenuate or otherwise block frequencies above a given threshold by selecting suitable values of the passive or active components in the low-pass filter. The design characteristic of low-pass filters is well known to the skilled person. As such, the detailed operation of the low-pass filter arrangement will not be discussed in detail.

The low pass filter arrangement 104, 105 may comprise one or more low pass filters, such as first low-pass filter 104 and a second low-pass filter 105. In the present example, the first and second low-pass filters 104, 105 are embodied as a resistor 107, 117 wherein each resistor 107, 117 is in series with a respective capacitor 109, 119.

It will be appreciated that in some examples the capacitor 109, 119 of the RC arrangement of each low pass filter arrangement 104, 105 may be charged via the resistor 107, 117 respectively coupled between the supply voltage terminal 102 and the capacitor 109, 119 at least when there is no glitch on the supply voltage terminal 102. The energy stored in the capacitor 109, 119 of the low-pass filter arrangement 104, 105 may be configured to provide power to the first detector circuit 106, the second detector circuit 126, the logic NOR circuitry 148 and the inverter arrangement 180 when the voltage at the supply voltage terminal drops, such as experienced during a negative glitch. It will also be appreciated that in some examples the capacitor 109, 119 of the low-pass filter arrangement 104, 105 may be configured to allow for continued operation of the circuit arrangement 100 during a negative pulse.

In some examples it will be appreciated that the resistor 107, 117 of the low-pass filter arrangement 105 may be replaced by a diode to prevent any current flowing from the capacitor 109, 119 of the low-pass filter arrangement 104, 105 to the supply voltage terminal 102 during the negative glitch. It will also be appreciated that the use of such a diode may prevent any current flow to the supply voltage terminal as long as the voltage on the capacitor of the low-pass filter arrangement 105 is below a turn-on voltage of the diode. In such examples, the capacitor 107, 117 of the low-pass filter arrangement 104, 105 can only be charged to the turn-on voltage of the diode to ensure there is no current flow to the supply voltage terminal 102 in the event of a negative glitch. In some examples the turn-on voltage of the diode may be around 0.3V (such as in the case of a Schottky diode). In other examples diodes with higher turn-on voltages can be used to allow for larger supply voltage levels to be used.

In some examples the capacitor 109, 119 of the low-pass filter arrangement 104, 105 is configured to store enough energy to allow the level-shifter 152 to switch and the capacitor 109, 119 is sized according to the turn-on voltage and energy requirements of the level shifter 152.

It will also be appreciated that in some examples, the resistance of the resistor 107, 117 of the low-pass filter arrangement 105 is selected such that it can control the recharge time of the capacitor 109, 119 of the low-pass filter arrangement 104, 105 when there is no glitch on the supply voltage terminal. In such an example the recharge time is reduced for a reduced resistor value.

It will also be appreciated that during a negative glitch on the supply voltage terminal 102, the capacitor 109, 119 of the low pass filter arrangement 104, 105 will discharge to the supply voltage terminal 102 through the resistor of the low-pass filter arrangement 104, 105. In such an event, the energy loss during a negative glitch can be reduced by using a high value resistor 107, 117. It will be appreciated that the resistance of the resistor 107, 117 of the low-pass filter arrangement 104, 105 will therefore be based on a compromise between the time taken to recharge the capacitor 109, 119 (where a lower resistance value would be preferred) and the energy loss during a negative glitch on the supply voltage terminal (where a higher resistance value would be preferred).

The circuit arrangement of FIG. 1 also comprises the first detector circuit 106. The first detector circuit comprises a PMOS transistor 108 and a first resistor 110. The first resistor comprises a first terminal 112 and a second terminal 114. It will be appreciated that the first resistor 110 may be implemented as a single resistor or a plurality of series and/or parallel resistive components coupled together to form the first resistor 110 depending on the value of the resistance required.

In some examples the first resistor 110 is configured to have a resistance value which is based on the off resistance of the PMOS transistor 108 used in the first detector 106.

The values of the resistor 107 and capacitor 109 of the low-pass filter arrangement 104 are selected to maintain a gate terminal 118 of a transistor 108 of the first detector circuit 106 at a voltage level before a glitch is present to the supply voltage terminal 102.

In some other examples, it will also be appreciated that the capacitor 109, 119 of a passive RC low-pass filter arrangement 104 can be used to hold the gate of the PMOS transistor 108 at a stable voltage (i.e., a voltage level before the glitch is present) during the glitch such that the effect of the glitch on the PMOS transistor 108 of the detector circuit 106 can be reduced.

In some examples the first resistor 110 can also be replaced by a diode arrangement to avoid discharging the capacitor of the low-pass filter arrangement 104 due to the PMOS transistor 108 having a forward bias. However, the use of a diode arrangement limits the operating voltage to the turn-on voltage of the diode as was described previously.

In some examples the first low-pass filter 104 may comprise a resistor with 10 k Ohm resistance and a capacitor with 0.5 pF of capacitance.

In some examples selecting suitable R and C values for the low-pass filter arrangement 104, 105 can allow for improved reaction times of the detector circuits 106, 126.

The PMOS transistor 108 comprises a source terminal 116 configured to receive the (unfiltered by the low pass filter arrangement) supply voltage, a gate terminal 118 configured to receive (from the low pass filter arrangement) the filtered supply voltage, and a drain terminal 120 coupled to the first terminal 112 of the first resistor 110. The second terminal 114 of the first resistor 110 is coupled to a reference voltage terminal 122, where the reference voltage terminal configured to be coupled to a reference voltage. The reference voltage is typically ground.

The circuit arrangement 100 of FIG. 1 further comprises a first detector output terminal 124 coupled to the first terminal 112 of the first resistor 110. The first detector output terminal 124 is configured to provide a first detection signal indicative of a glitch comprising a transient, positive change in the supply voltage.

It will be appreciated that the PMOS transistor 108 of the first detector circuit 106 is coupled to the first resistor 110 such that it is driving a resistive load to ground. In the static state, i.e. when there is no glitch applied to the supply voltage terminal 102. The gate of the PMOS transistor is tied to the source of the PMOS transistor such that the source to gate voltage (Vgs) of the PMOS transistor is zero and as such no current flows. In particular, where there is no glitch the supply voltage applied to the source terminal 116 of the PMOS transistor 108 is the same as the voltage applied to the gate terminal 118 of the PMOS transistor 108. As such the source to gate voltage difference of the PMOS transistor 108 will be zero and the transistor will not conduct. If the supply voltage rises in a transient manner, such due to the occurrence of a glitch, the source to gate voltage (Vgs) is increased as the filtered voltage (where the glitch is filtered out) is applied to the gate and the transient voltage (i.e. the increased voltage) is applied to the source. The increase in source to gate voltage causes the PMOS transistor 108 to turn on and thereby a first detection signal is provided at the first detector output terminal 124.

It will therefore be appreciated that the PMOS transistor 108 of the first detector circuit may configured such that the first detection signal is indicative of the occurrence of a positive glitch. However, it will be understood that for the first detector circuit 106 to generate the first detection signal, the magnitude of the glitch is above a turn on voltage (Vgs) of the PMOS transistor 108 of the first detector circuit 106. In some examples, the magnitude of the glitch may need to be at least twice the threshold voltage of the PMOS transistor 108. In other examples the glitch may need to be less than 2 times the threshold voltage. In other examples the glitch may need to be X times the threshold voltage of PMOS transistor 108 in order to be accurately detected, where X may be any number greater than one and may not be limited to whole integers.

The second detector circuit 126 comprises a PMOS transistor 128 and a NMOS transistor 130. The PMOS transistor 128 comprises a source terminal 132 configured to receive the filtered supply voltage, a gate terminal 134 configured to receive the supply voltage, and a drain terminal 136.

The NMOS transistor 130 comprises a drain terminal 138, a gate terminal 140 configured to receive the supply voltage, and a source terminal 142 configured to be coupled to the reference voltage terminal 122.

The drain terminal 138 of the NMOS transistor 130 is coupled to the drain terminal 136 of the PMOS transistor 128. It will be appreciated that the PMOS transistor may be implemented as a single transistor or alternatively the PMOS transistor may be implemented as a number of PMOS transistors arranged in either a parallel or series configuration. In one or more examples, the NMOS transistor 130 may also be implemented as one single transistor or a number of NMOS transistors arranged in either a parallel or series configuration. The choice of using a single transistor or multiple series and/or parallel transistor components may be determined based on the power and/or voltage characteristics of the circuit arrangement 100 and will not be described in detail here.

The second detector circuit 126 comprises a second detector output terminal 144 coupled to the drain 136 of the PMOS transistor and to the drain 138 of the NMOS transistor 130. The second detector output terminal 144 is configured to provide a second detection signal indicative of a glitch comprising a transient, negative change in the supply voltage.

Thus, in the present and one or more other examples, the first detector circuit 106 is configured to generate its first detection signal in response to transient increases in the supply voltage, while the second detector circuit 126 is configured to generate its second detection signal in response to transient decreases in the supply voltage.

It will be appreciated that the PMOS transistor 128 and NMOS transistor 130 of the second detector circuit 126 have their gate terminals both coupled together and receive the supply voltage (that is, the unfiltered supply voltage) which may contain a glitch.

The arrangement of the transistors 128, 130 of the second detector circuit 126 is such that the second detector circuit 126 provides the second detection signal at the second detector output terminal 144 when a negative glitch of a predetermined voltage threshold is detected.

The source of the PMOS transistor 128 is coupled to a filtered version of the supply voltage. If the supply voltage drops due to a transient negative pulse, the PMOS transistor 128 will be turned on and the NMOS transistor is turned off. This provides the second detection signal at the second detector output terminal 144.

In this arrangement it will be appreciated that when there is no glitch applied to the supply voltage, the PMOS transistor 128 remains closed as the source-to gate voltage of the PMOS transistor is zero. However, when a negative glitch is applied, the PMOS transistor 128 of the second detector circuit 126 conducts and the NMOS transistor 130 of the second detector circuit 126 is turned off so as to provide the second detection signal at the second detector output terminal 144.

It will therefore be appreciated that the PMOS transistor 128 of the second detector circuit 126 may configured such that the second detection signal is indicative of the occurrence of a negative glitch. However, it will be understood that for the second detector circuit 126 to generate the second detection signal, the magnitude of the glitch may need to be above a turn on voltage (Vgs) of the PMOS transistor 128 of the second detector circuit 126.

In one or more examples, during a positive glitch on the supply voltage, the gate terminal 134 of the PMOS transistor 128 will receive the positive glitch and will therefore keep the PMOS transistor 128 turned off. Thereby there will be no current flow through the second detector 126 during a positive glitch.

The arrangement shown in FIG. 1 may be advantageous because when there is no glitch present on the supply voltage, the circuit arrangement 100 consumes little to no power as there is no standby current flowing through either of the first detector circuit 106 or the second detector circuit 126. Both the first detector circuit 106 and the second detector circuit 126 are configured such that there is no current flow unless a glitch is detected. This allows for increased efficiency and enables a very low power design to be realised. This also makes this circuit arrangement 100 very useful for battery powered detector circuits.

Furthermore, as the glitch detection is achieved without the need for a comparator, the area on a semiconductor die can be reduced due to the reduced number of components required compared to a comparator-based detector circuit. Furthermore, the lack of a comparator can allow for reduced power usage leading to a more efficient circuit arrangement.

The circuit arrangement 100 comprises a circuit-arrangement output terminal 146. This is the output of the circuit arrangement 100 which can provide an indication of a glitch to a further circuit to which this circuit arrangement 100 is to be coupled. The circuit-arrangement output terminal 146 may be configured to provide an output signal indicative of the detection of a glitch in the supply voltage based on the first detection signal and/or the second detection signal.

It will be appreciated that the circuit arrangement output terminal 146 may be coupled directly to the first detector output terminal 124 and/or to the second detector output terminal 144. Thus, in one or more examples, the first detection signal and/or the second detection signal may be provided directly to the circuit-arrangement output terminal 146 and will therefore collectively comprise the output signal. Alternatively, in other embodiments the circuit arrangement output terminal 146 may be coupled to the first detector output terminal 124 and/or to the second detector output terminal 144 via one or more other circuit modules. For example, the circuit arrangement output terminal 146 may be coupled to the first detector output terminal 124 and/or to the second detector output terminal 144 via one or more of the logic NOR circuitry 148, the latching circuit 154 and/or the level shifter 152 wherein the level shifter is used in combination with the inverter arrangement 180. Thus, in such other embodiments, such as that shown in FIG. 1, the output signal is derived from the first detection signal and the second detection signal based on the action of the further modules.

In one or more examples the circuit arrangement 100 may comprise the logic NOR circuitry 148. The logic NOR circuitry 148 can be configured to receive the first detection signal and the second detection signal. The output signal provided at the circuit arrangement output terminal 146 may be based on the output of the logic NOR circuitry 148. Thus, the output signal is indicative of either or both of the first detection signal and the second detection signal being indicative of a glitch. It will be appreciated that the logic NOR circuitry may in some examples, be replaced with another type of logic circuitry such as a logic OR circuit.

The logic NOR circuitry 148 may comprises a first logic input terminal 156, a second logic input terminal 158 and a logic output terminal 160. Wherein the first logic input terminal 156 is connected to the first detector output terminal 124 and the second logic input terminal 158 is connected to the second detector output terminal 144. The logic output terminal 160 may be coupled to the circuit-arrangement output terminal 146 to provide the output signal. It will be appreciated that the logic NOR circuitry may be coupled to the circuit-arrangement output terminal 146 either directly or via one or more other circuit arrangement modules.

In one or more examples the circuit arrangement 100 may comprise a second supply terminal 150 configured to receive a second supply voltage. The circuit arrangement 100 may thus comprise a first voltage domain based on the supply voltage provided at the supply terminal 102 and a second voltage domain based on the second supply voltage provided at the second supply terminal 150. It will be appreciated that a voltage domain can be related to a group of components which operate at a given voltage level/range. It is also known to a skilled person that circuits can be designed to have components which operate in different voltage domains on a common IC die.

The first detector circuit 106 and second detector circuit 126 may form part of the first voltage domain, and the circuit-arrangement output terminal 146 may comprise part of the second voltage domain. It will be appreciated that in some examples the supply voltage may be lower than the second supply voltage.

It will be appreciated that in some examples the supply voltage is for providing power to components in the first voltage domain of the circuit arrangement 100. It will also be appreciated that the second supply voltage is for providing power to components in the second different voltage domain of the circuit arrangement.

The circuit arrangement 100 may comprise a level shifter 152 as an interface between the first and second voltage domains. The level shifter 152 may be configured to receive one or more signals based on the first detection signal and the second detection signal. The level shifter may be configured to level shift said one or more signals to the second voltage domain in order to provide the output signal at the circuit-arrangement output terminal 146 in the second voltage domain.

In some examples the level shifter arrangement 152 may be coupled with an inverter arrangement 180. The inverter arrangement may be configured to be coupled to the logic output terminal 160 to provide an inverted version of the output of the logic circuitry 148. The inverted and non-inverted output of the logic circuitry can be provided as inputs to the level shifter arrangement 152. In some examples the inverter arrangement may be external to the level shifter arrangement 152. In yet other examples, the inverter arrangement 180 may be coupled with one of the other modules such as the logic circuitry 148 or the level shifter 152.

As purely an example, the supply voltage of the first detector circuit and the second detector circuit comprises 0.8V. The second supply voltage may comprise 1.8V. In other examples the supply voltage may comprise 1.8V and the second supply voltage may be in a voltage domain that is higher or lower than the supply voltage.

In one or more examples the level shifter arrangement 152 may comprise a first level shifter input terminal 162, a second level shifter input terminal 164, and a level shifter output terminal 166. The first level shifter input terminal 162 and the second level shifter input terminal 164 may be coupled to the logic output terminal 160 and the level shifter output terminal 166 may be coupled to the circuit-arrangement output terminal 146. In the present example, the first level shifter input terminal 162 and the second level shifter input terminal 164 are configured to receive inverted versions of the same signal from the logic output terminal 160. Thus, one of the terminals 162, 164 receives the signal directly from the logic circuitry 148 and the other one of the terminals 164, 162 receives the signal via the inverter arrangement 180. The level shifter 152 comprises a first PMOS transistor 181 having a source terminal coupled to the second supply terminal 150 and a drain terminal coupled to a first terminal of a first NMOS transistor 182. A second terminal of the first NMOS transistor 182 is coupled to the reference terminal 122. The level shifter 152 further comprises a second PMOS transistor 183 having a source terminal coupled to the second supply terminal 150 and a drain terminal coupled to a first terminal of a second NMOS transistor 184. A second terminal of the second NMOS transistor 184 is coupled to the reference terminal 122. A gate terminal of the first PMOS transistor 181 is coupled to the drain terminal of the second PMOS transistor 183. A gate terminal of the second PMOS transistor 183 is coupled to the drain terminal of the first PMOS transistor 181. A gate terminal of the first NMOS transistor 182 comprises the second level shifter input terminal 164. A gate terminal of the second NMOS transistor 184 comprises the first level shifter input terminal 162. The drain terminal of the first PMOS transistor 181 comprises the level shifter output terminal 166. Other level shifter configurations are possible, as is known in the art.

In one or more examples, the circuit arrangement 100 may further comprise the latching circuit 154. The latching circuit may be configured to receive at least one signal based on one or both of, the first detection signal and the second detection signal and may be configured to latch the output signal for subsequent use by a further circuit (coupled to the circuit-arrangement output terminal 146). It will be appreciated that the duration of a glitch may be very short lived, and therefore it may be beneficial to provide a latching circuit that can change to a latched state upon detecting a glitch so that any further circuitry can register this glitch and take appropriate action such as to protect other circuitry from an attack.

In one or more examples the latching circuit 152 can be implemented as a RS Flip Flop circuit, as shown in FIG. 1. It will be appreciated that any form of latching circuit can be used to hold the circuit-arrangement output terminal 146 at a predetermined level to indicate the detection of a glitch. In some examples the RS Flip Flop circuit may be configured to receive a reset signal from the further circuit. Thus, the RS flip flop provides an output to indicate the occurrence of a glitch until the further circuit resets it by way of the reset signal.

The RS flip flop circuit may comprise an input terminal 168, a reset terminal 170, and a latching output terminal 172. In some examples the input terminal 168 is coupled to the level shifter output terminal 166 and the reset terminal 170 is connectable to a further circuit to reset the RS flip flop circuit. In some examples the latching output terminal 172 is connected to the circuit-arrangement output terminal 146.

It will be appreciated that the latching circuit 154 can be provided in either the first voltage domain or in the second voltage domain, such that the latched output can represent first detection signal or the second detection signal in the first voltage domain. In alternative examples the latching circuit 154 may be coupled to the output of the logic circuitry to indicate that a glitch has been detected by one of the first and/or second detector circuits. In other examples the latching circuit may be coupled to the output of the level shifter and provide an output in the second voltage domain.

In some examples the reset-signal may be an acknowledgement signal configured to allow the latching circuit to be reset. Resetting the latching circuit can enable the circuit to detect a further glitch. Furthermore, the acknowledgement signal may allow any further circuitry to monitor the number glitches that are detected to determine whether any remedial action needs to be taken.

In one or more examples, such as that shown in FIG. 1, the low pass filter arrangement 104, 105 may comprise a first low pass filter 104 and a second low pass filter 105. The first low pass filter 104 may be configured receive the supply voltage and provide a filtered supply voltage to the first detector circuit 106. The second low pass filter 105 may be configured to receive the supply voltage and provide a filtered supply voltage to the second detector circuit 126.

Figure 2:
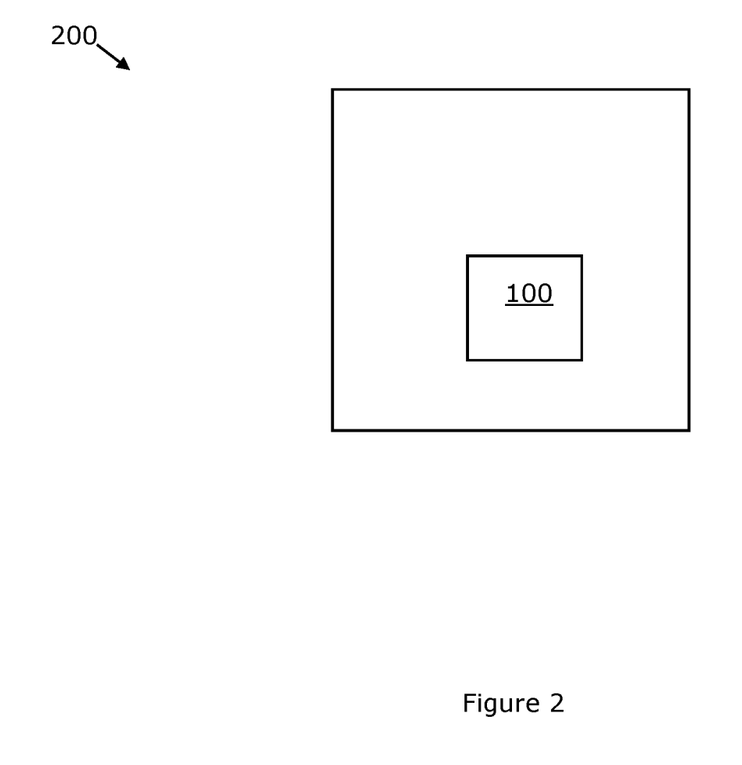
FIG. 2 shows an electronic device including the circuit arrangement.

FIG. 2 shows an electronic device 200 including the circuit arrangement 100. In some examples the electronic device may comprise one of a microcontroller or a microprocessor that may be used in an automotive application such as in a vehicle such as a battery management system of an autonomous vehicle. Alternatively, the device may comprise a portable communication device such as a mobile phone. Any other device which has a secure domain within it may also include the circuit arrangement 100.

Figure 3:
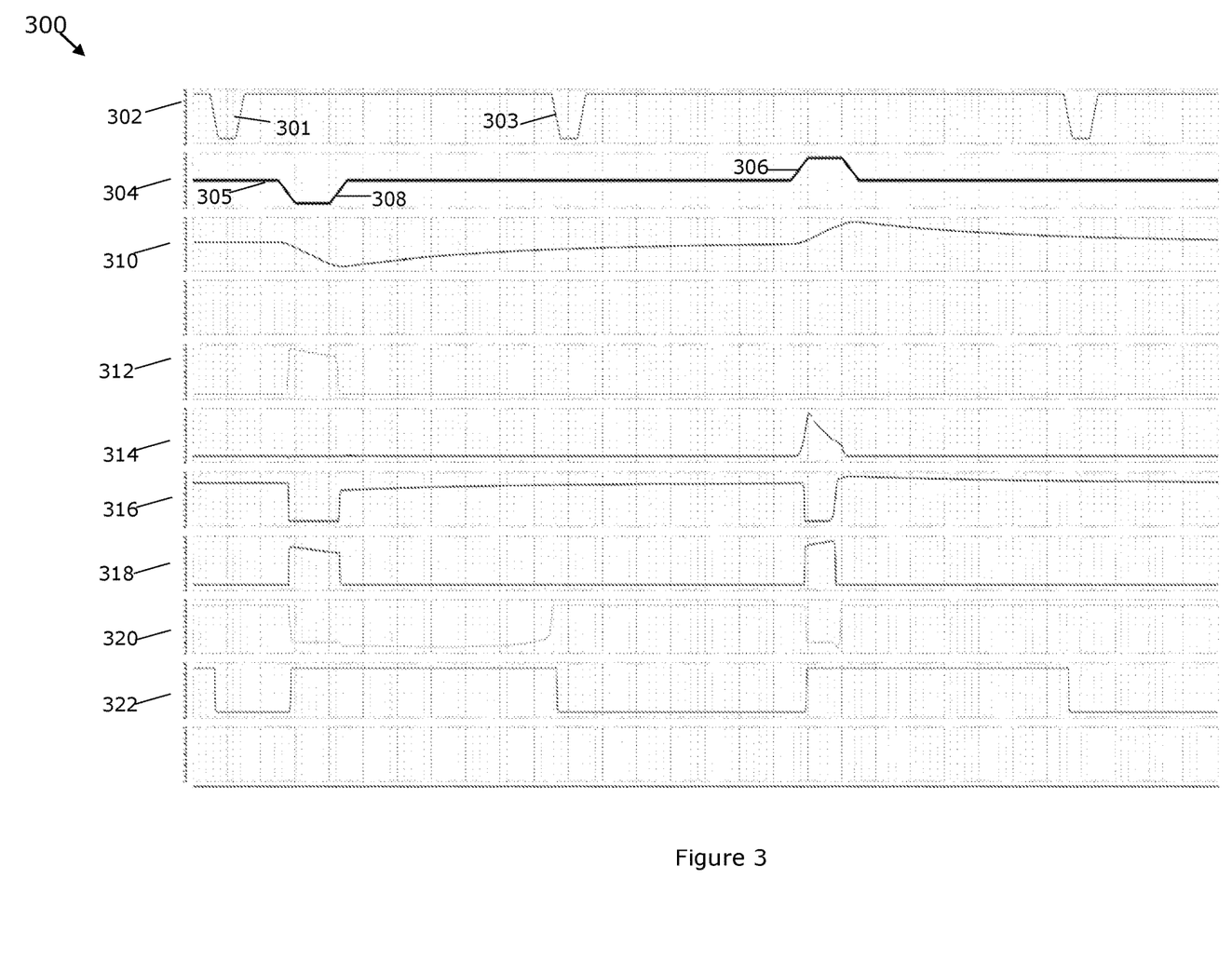
FIG. 3 shows an example timing diagram.

FIG. 3 shows an example timing diagram identifying the signals which can be monitored to enable the supply voltage to be monitored to detect whether a glitch has occurred. FIG. 3 shows the reset signal 302. The initial reset pulse 301 is used to initially reset the latching circuit and subsequently reset the latching circuit after each detection of a glitch. The reset signal consists of at least a pulse 301, 303 which can be provided to the reset terminal 170 of the latching circuit following the detection of a glitch. It will be appreciated that the reset signal can be any signal capable of resetting the latching circuit such as a logic state change or a particular voltage pulse which can be either positive or negative. In some examples the reset signal may be based on any of the other signals shown in FIG. 3.

FIG. 3 further shows the supply voltage 304 comprising a positive glitch 306 and a negative glitch 308. In the example of FIG. 3 the nominal supply voltage is set at a predetermined level 305.

In the example of FIG. 3, the glitch 306, 308 is a transient change which in some examples may have a 1 ns rise/fall time and a 3 ns pulse width. In some examples the rise/fall times may be different and may be faster or slower than the example shown.

In some examples the positive glitch may increase the supply voltage to 1.4V. It will be appreciated that the voltage level during a positive glitch may be higher or lower than the 1.4V example shown.

In some other examples the negative glitch may decrease the supply voltage level to 0.2V. It will be appreciated that the voltage level during a negative glitch may be higher or lower than the 0.2V example shown.

The filtered supply voltage 310 is shown in which the effect of the glitch 306, 308 is filtered such that the filtered supply voltage does not change as much as the supply voltage 304. It will be appreciated that the scale of the axis showing the filtered supply voltage covers a much smaller range of voltages than the scale used to show the supply voltage 304 for purposes of clarity.

FIG. 3 also shows the first detection signal 314 and the second detection signal 312, wherein the first detection signal is the positive glitch detection signal and wherein the second detection signal is the negative glitch detection signal.

FIG. 3 also shows the logic output signal 316 as well as the inverted logic output signal 318, wherein the two logic output signals are inverted versions of each other provided by the inverter arrangement 180. These two signals 316, 318 are used to drive the level shifter 152 to shift the signal to a different voltage domain. The level shifted signal 320 is also shown in FIG. 3. It will be appreciated that the scale of the axis showing level shifted signal 320 covers a much larger range of voltages than the scale used to show the first detection signal 314 and second detection signal 312 for the purposes of clarity. It will be appreciated that in some examples the level shifter 152 may shift the signal to a lower voltage level compared to the level of the first detection signal or the second detection signal. The level shifted signal is provided to the latching circuit and causes the circuit to latch and provide the latched output signal 322 at the circuit-arrangement output terminal 146.

The duration of the latched signal can be defined by setting the frequency of the reset signal 302.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A circuit arrangement for detecting a glitch on a supply voltage comprising:
   a supply terminal configured to receive the supply voltage;
   a low pass filter arrangement coupled to the supply terminal and configured to receive the supply voltage and provide a first filtered supply voltage and a second filtered supply voltage;
   a first detector circuit, comprising
      a first PMOS transistor,
      a first resistor comprising a first terminal and a second terminal, the first PMOS transistor comprising
         a first source terminal configured to receive the supply voltage,
         a first gate terminal configured to receive the first filtered supply voltage, and
         a first drain terminal coupled to the first terminal of the first resistor, wherein the second terminal of the first resistor is coupled to a reference voltage terminal, the reference voltage terminal configured to be coupled to a reference voltage, and
      a first detector output terminal coupled to the first terminal of the first resistor, wherein the first detector output terminal is configured to provide a first detection signal indicative of a first glitch comprising a transient, positive change in the supply voltage;
   a second detector circuit, comprising
      a second PMOS transistor,
      a NMOS transistor, wherein
      the second PMOS transistor comprises
         a second source terminal configured to receive the second filtered supply voltage,
         a second gate terminal configured to receive the supply voltage, and
         a second drain terminal,
      the NMOS transistor comprising
         a third drain terminal,
         a third gate terminal configured to receive the supply voltage,
         a third source terminal configured to be coupled to the reference voltage terminal, and wherein the third drain terminal of the NMOS transistor is coupled to the second drain terminal of the second PMOS transistor, and
      a second detector output terminal coupled to the second drain terminal of the second PMOS transistor and to the third drain terminal of the NMOS transistor, wherein the second detector output terminal is configured to provide a second detection signal indicative of a second glitch comprising a transient, negative change in the supply voltage; and
   a circuit-arrangement output terminal configured to provide an output signal indicative of the detection of the first glitch and the second glitch in the supply voltage based on the first detection signal and the second detection signal, respectively.

2. The circuit arrangement of claim 1, further comprising logic OR circuitry configured to receive the first detection signal and the second detection signal and wherein the output signal is based on either or both of the first detection signal and the second detection signal being indicative of the first glitch and the second glitch, respectively.

3. The circuit arrangement of claim 1, wherein the circuit arrangement comprises a second supply terminal configured to receive a second supply voltage, and wherein the circuit arrangement comprises:

a first voltage domain based on the supply voltage provided at the supply terminal, and a second voltage domain based on the second supply voltage provided at the second supply terminal, wherein the first detector circuit and second detector circuit form part of the first voltage domain, and the circuit-arrangement output terminal comprises part of the second voltage domain, and wherein the circuit arrangement comprises a level shifter configured to receive one or more signals based on the first detection signal and the second detection signal and level shift said one or more signals to the second voltage domain for providing said output signal at the circuit-arrangement output terminal.

4. The circuit arrangement of claim 3, wherein the supply voltage is lower than the second supply voltage.

5. The circuit arrangement of claim 1, further comprising a latching circuit, the latching circuit configured to receive at least one signal based on one or both of the first detection signal and the second detection signal and configured to latch the output signal for a further circuit.

6. The circuit arrangement of claim 5, wherein the latching circuit is a RS Flip Flop.

7. The circuit arrangement of claim 6, wherein the RS Flip Flop is configured to receive a reset signal from the further circuit.

8. The circuit arrangement of claim 1, wherein the low pass filter arrangement comprises:

a first low pass filter, and a second low pass filter, wherein the first low pass filter is configured receive the supply voltage and provide the first filtered supply voltage to the first detector circuit, and wherein the second low pass filter is configured to receive the supply voltage and provide the second filtered supply voltage to the second detector circuit.

9. The circuit arrangement of claim 1, wherein the low pass filter arrangement comprises at least one RC filter.

10. The circuit arrangement of claim 1, wherein the first resistor has a resistance value based on the off resistance of the first PMOS transistor used in the first detector.

11. The circuit arrangement of claim 1 further comprising:

a logic OR circuitry comprising a first logic input terminal, a second logic input terminal, and a logic output terminal, wherein the first logic input terminal is connected to the first detector output terminal, and the second logic input terminal is connected to the second detector output terminal, and wherein the logic output terminal is coupled to the circuit-arrangement output terminal.

12. The circuit arrangement of claim 11 further comprising:

a level shifter arrangement comprising:

a first level shifter input terminal, a second level shifter input terminal, and a level shifter output terminal, wherein the first level shifter input terminal and the second level shifter input terminal are connected to the logic output terminal and wherein the level shifter output terminal is coupled to the circuit-arrangement output terminal.

13. The circuit arrangement of claim 12 further comprising:

a latching circuit comprising a RS flip flop circuit, comprising:

an input terminal, a reset terminal, and a latching output terminal, wherein the input terminal is coupled to the level shifter output terminal, the reset terminal is connectable to a further circuit to reset the RS flip flop circuit, and wherein the latching output terminal is connected to the circuit-arrangement output terminal.

* * * * *